July 7, 1959
L. A. FAJARDO
2,893,300
CAMERA
Filed July 11, 1955
3 Sheets-Sheet 1
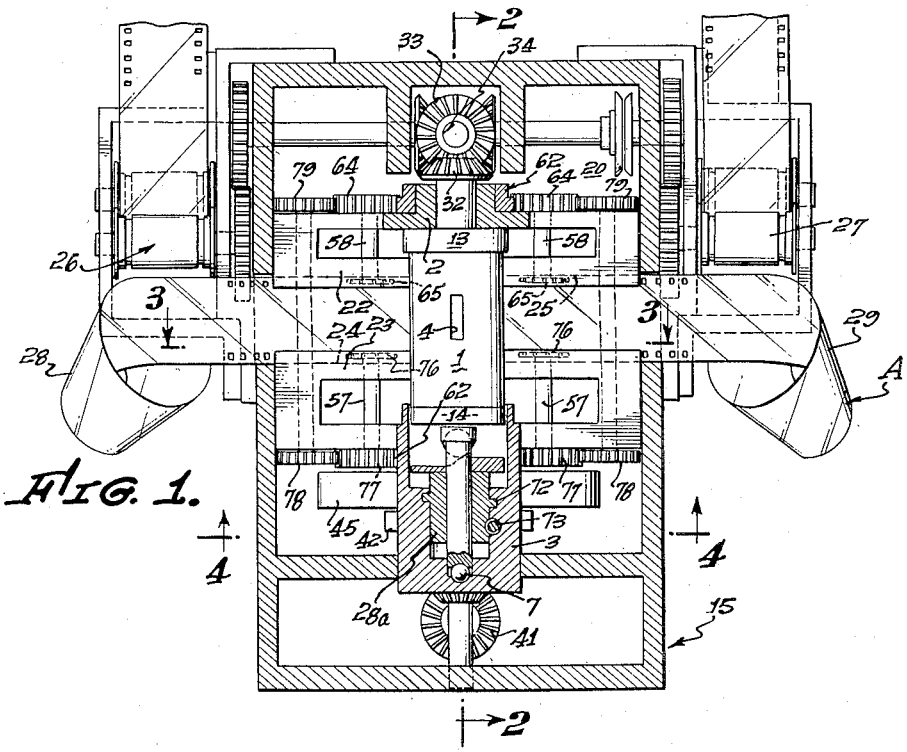
Fig. 1.
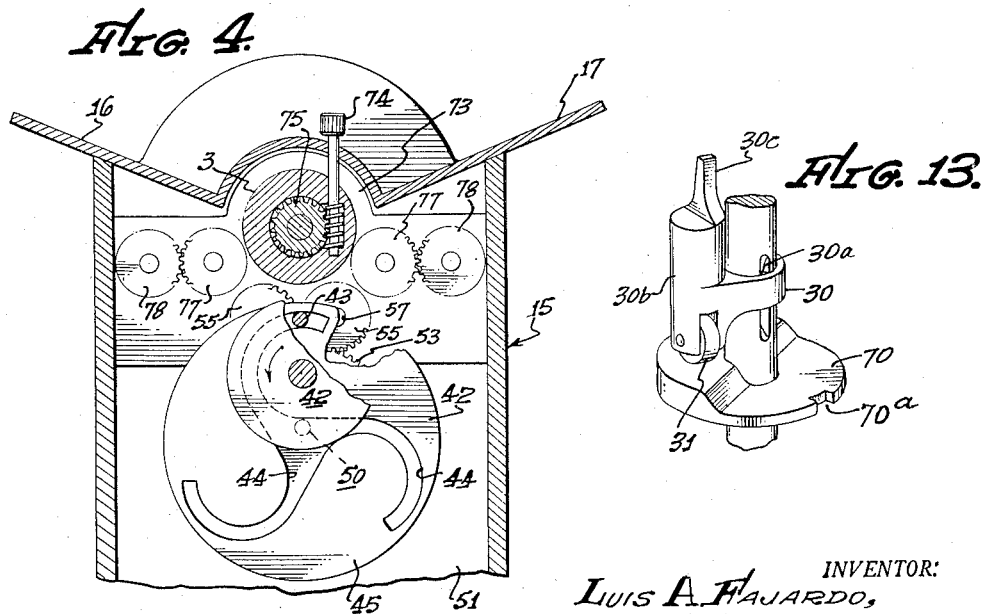
Fig. 4.
Fig. 13.
INVENTOR:
LUIS A. FAJARDO,
BY O O Martin
ATTORNEY.

July 7, 1959    L. A. FAJARDO    2,893,300
CAMERA
Filed July 11, 1955    3 Sheets-Sheet 2
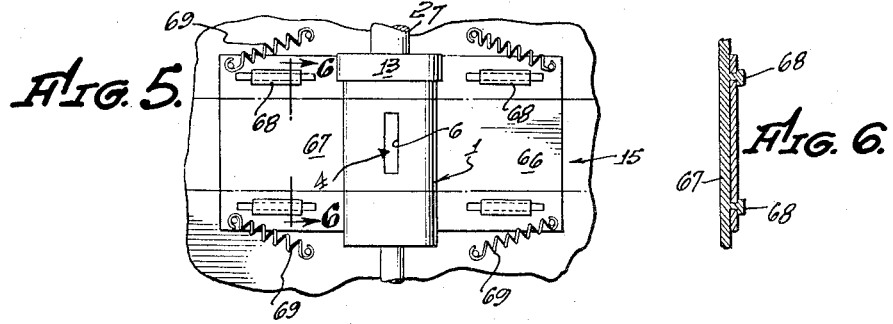
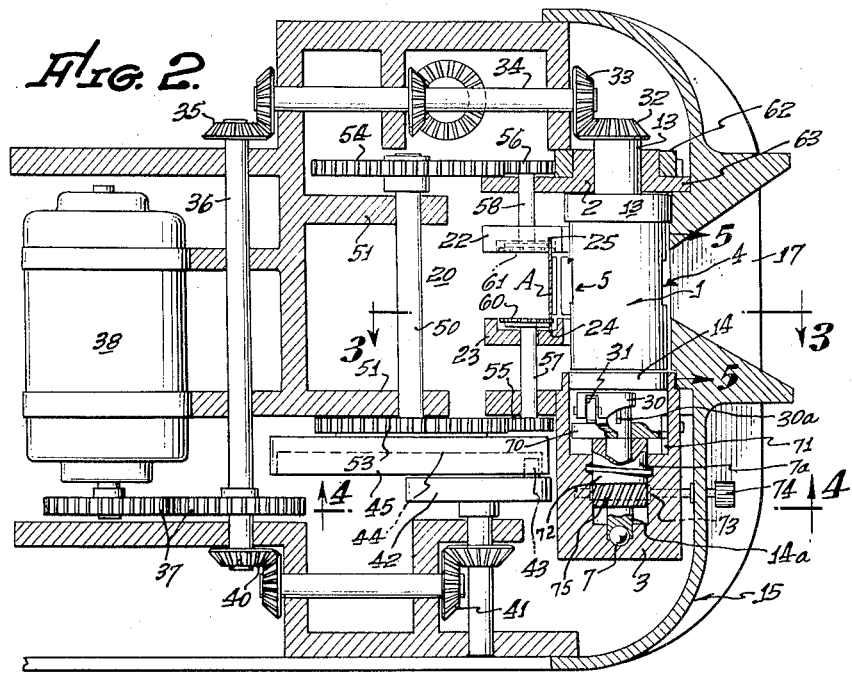
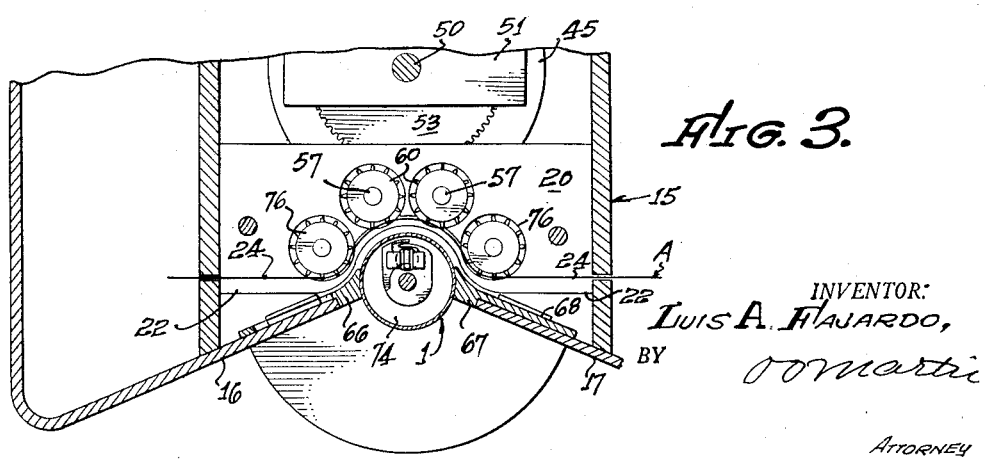
INVENTOR:
LUIS A. FAJARDO,
BY
ATTORNEY July 7, 1959 L. A. FAJARDO 2,893,300
CAMERA
Filed July 11, 1955 3 Sheets-Sheet 3
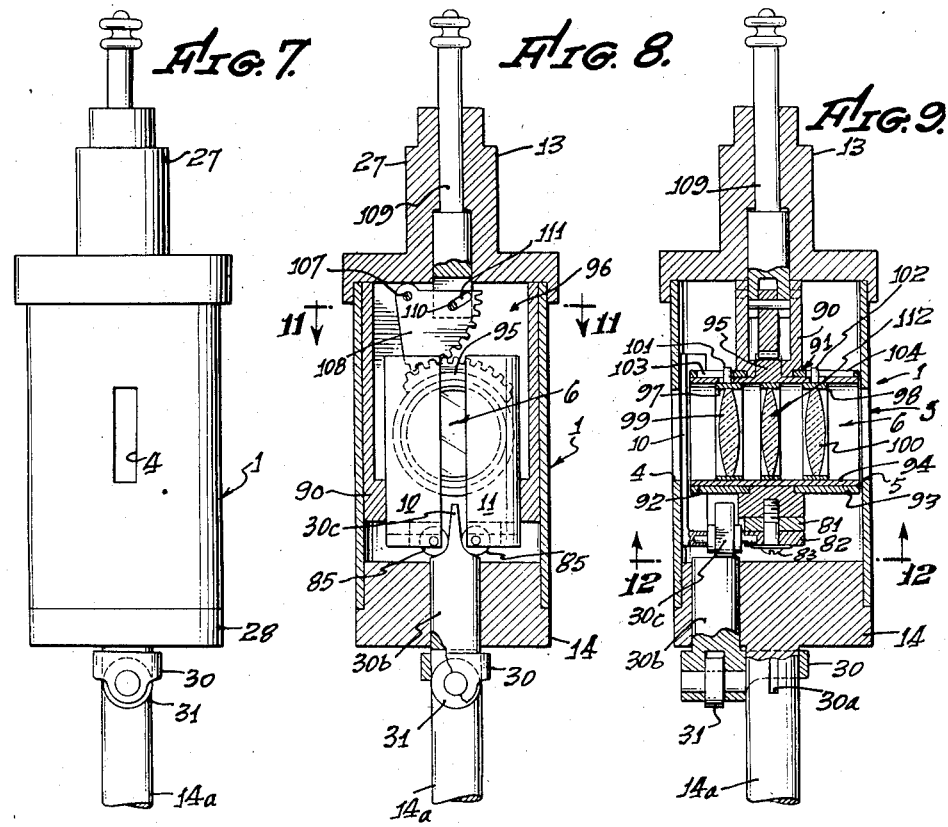
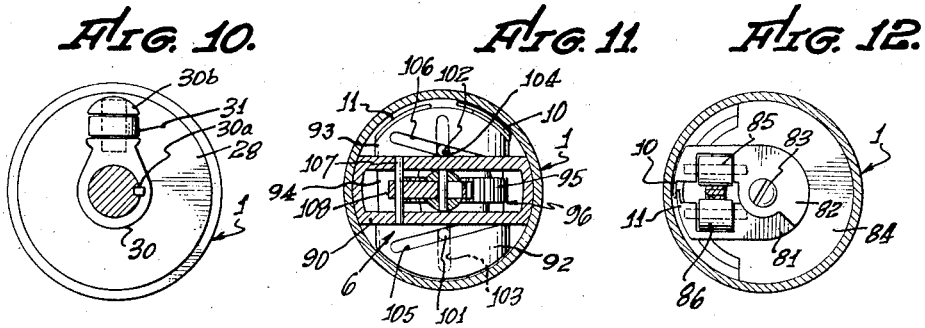
INVENTOR.
LUIS A. FAJARDO,
BY O. O. Martin
ATTORNEY.

United States Patent Office 2,893,300
Patented July 7, 1959

2,893,300

CAMERA

Luis A. Fajardo, Glendale, Calif.

Application July 11, 1955, Serial No. 521,170

7 Claims. (Cl. 95—16)

This invention relates to a camera of the type in which a film is intermittently advanced along a curved path behind a continuously rotating lens in concentric relation to the axis of rotation thereof for the purpose of obtaining wide angle exposures. In cameras of this type which have come to my notice, the objective is mounted within a rotating drum and the shutter mechanism is placed in front of this drum. This arrangement has not been found satisfactory for various reasons, one being that the shutter mechanism materially limits the angular width of the exposure.

It is in view of this the object of the present invention to provide a camera of this type in which the shuter mechanism is placed within the drum or cylinder in which the objective is mounted hereby leasing the space in front of the cylinder entirely unobstructed for wide panoramic exposures. A further object is to provide within the cylinder means for adjusting the focal length of the objective within the cylinder. Another object is the provision of means for eliminating all danger of leakage of light rays past the rotating cylinder. Still another object is to provide improved means of intermittently advancing the film in synchronism with the rotations of the cylinder.

These and other objects of the invention, together with the many advantageous features thereof will be apparent from the following detailed description and by referring to the accompanying drawing in which a preferred form of the invention is illustrated.

In the drawings:

Fig. 1 is a front elevational view of the portion of a camera in which the devices of the invention are located and with the front portion of the framing thereof broken away for the sake of clearness;

Fig. 2 is a side elevational view of the device taken substantially on line 2—2 of Fig. 1, in the direction of the arrows;

Fig. 3 is a fragmentary plan view of the left front corner of the device taken substantially on lines 3—3 of Figs. 1 and 2;

Fig. 4 shows portions of the mechanism within the central portion of the device and is taken substantially on line 4—4 of Fig. 2, in the direction of the arrows;

Figs. 5 and 6 illustrate light excluding elements of the device;

Fig. 7 is a front elevational view of the objective supporting cylinder of the device;

Fig. 8 is a similar view taken substantially through the vertical center of Fig. 7;

Fig. 9 is like Fig. 8 only taken at right angles thereto;

Fig. 10 is a bottom view of Fig. 7;

Fig. 11 is a plan view taken substantially on line 11—11 of Fig. 8 in the direction of the arrows;

Fig. 12 is a bottom view of the cylinder taken substantially on line 12—12 of Fig. 9 in the direction of the arrows; and Fig. 13 illustrates a portion of the shutter operating mechanism of the camera.

The lens and shutter mechanism of the camera is in Figs. 1, 2 and 3 of the drawings shown to include a cylindrical casing 1 which is mounted for rotation in bearings 2, 3 and connected for continuous rotation in the manner hereinafter described. In the casing is cut two narrow rectangular openings 4, 5 for passage of light through the objective 6, see also Figs. 7–9.

Within the cylinder is placed a shutter consisting of arcuate half-portions 10, 11 which, as will be explained presently, are mounted for relative circular movement against the inner wall of the cylinder to open and close the passage of light through the lenses of the objective during the rotation of the cylinder, intermittently to admit a beam of light to a film A. The cylinder is, in Fig. 3, shown mounted within a housing 15, the front wall of which is inwardly directed, substantially as indicated at 16, 17 to provide an opening of at least 140° in front of the cylinder. A frame 20 is mounted within the inner walls of the camera housing 15, substantially as indicated in Figs. 3 and 4 of the drawings. The front edges 22, 23 of this frame are behind the cylinder shown inwardly curved in concentric relation thereto and grooves 24, 25 are sunk in the opposed inner surfaces of the frame along the front edges thereof to form guides for the film A. Feeding devices 26, 27 are mounted within the outer spaces of the housing and the film extends from the feeding device 26 through slots of the inner housing walls and along these guide grooves to the other feeding devices. These feeding devices, as well as the additional mechanism for feeding the film through the grooves 24, 25 of the frame will hereinafter be more fully described.

The film is at 28, 29 shown looped in order to make possible the rectangular turns from the feeding devices to the guide grooves of the frame 20. It is important to note that all three feed mechanisms operate in synchronism and that, for this reason, the central feed mechanism is merely required to advance the film through the grooves. The loops 28, 29 in the film eliminate all danger of drag on the film, as might be the case if no such loops were provided or the central feed mechanism were solely depended upon to advance the film.

It was above stated that the cylinder is mounted for continuous rotation and that the film is intermittently advanced. This advance movement is obtained in the following manner. The cylinder is held in upper and lower hubs 13, 14 and a bevel gear 32 is secured in position on the upper end of the hub 13. This gear is, as best shown in Figs. 1 and 2, driven by a similar gear 33 of a shaft 34 which, through a train of gears 35, a shaft 36 and gears 37 is connected for rotation by an electric motor 38. A second train of gears 40, 41 connect a cam disk 42 for continuous rotation by the motor. A stud 43 of this disk engages the cam slot 44 of a Geneva type of gear 45. Rotation of the cam disk 42, in the direction indicated by the arrow in Fig. 4, will commence to impart rotation to the gear 45 the moment the cylinder light inlet 4 passes within the front wall 16, 17 of the housing 15. The gear ratio of the connection from the motor to the cam disk 42 is calculated to complete each rotative movement of the Geneva gear 45 before the inlet opening 4 of the cylinder again passes into the opening in the front wall of the housing.

The Geneva gear 45 is mounted on a shaft 50 which is seated for rotation in a bracket 51 of the housing and gears 53, 54 are secured in position on this shaft. These gears are in permanent mesh with pinions 55, 56 of axially alined stub shafts 57, 58, to the adjacent ends of which sprocket wheels 60, 61 are rigidly secured. The gears 56 are in permanent mesh with an annular gear 62 which is mounted for rotation on the portion 63 of the camera frame in which the cylinder hub 13 is rotatable. This gear 62 is in permanent mesh with gears 64 to the lower ends of the shafts 58 of which additional sprocket wheels 65 are secured to engage the upper row of film perforations. Similar sprocket wheels 76 are mounted in axial alinement therewith to engage the lower row of film perforations and they are through gears 77, 78 and 79 connected for rotation by the gears 64 to insure correct advance movement of the film. The sprockets of these wheels engage conventional perforations of the film to impart advance movement thereto and the gear ratio is calculated uniformly to impart a predetermined extent of advance movement to the film during each rotation of the cylinder.

It is most important to provide means for tightly shutting off passage of light between the cylinder wall and the front wall of the housing. I have for this purpose mounted fibre pads 66, 67 in the front opening of the housing and these pads are, as indicated at 68, in Figs. 5 and 6, mounted for adjustment in the housing wall tightly to engage the surface of the cylinder. Springs 69 maintain the pads pressed against the surface of the cylinder. It is in addition of importance to provide means for closing the inlet opening 4 during its rotative movement within the housing. This is done by the shutter 10, 11 in the following manner.

It was above stated that the cylinder is mounted for rotation in upper and lower bearings 2, 3. The lower cylinder hub 14 terminates at the bottom in a cylindrical stem 14ª which rests on a ball 7 seated in the bottom of the bearing to minimize friction during cylinder rotations. As a further aid to friction elimination it is advantageous to pour oil into the bearing before the cylinder is mounted therein. A bracket 30 is mounted for axial movement on the stem and it is held against rotative movement by a key 30ª, substantially as indicated in Figs. 1, 9 and 13. The bracket is shown upwardly extended to form a stud 30ᵇ riding in a passage through the cylinder hub and this stud terminates at the top in a tapered tip 30ᶜ. A roller 31 is placed in the bracket to ride on a cam disk 70 seated on the stem of the cylinder hub and a key 71 of the hub engages a groove 70ª of the disk to maintain this disk unturned within the bearings 3. A threaded sleeve 72 is seated in threads of the bearing for axial adjustment on the hub steam 14ª correctly to position the cam disk as required for the shutter movement. This adjustment may be obtained by mounting a screw or worm 73 in the bearing for engagement with worm threads 75 of the sleeve. A knob 74 is mounted on the worm shaft outside the housing for manual rotation to effect such adjustment. When so arranged, it is seen that the roller 31 will, during rotation of the cylinder, be moved upwardly on the cam disk 70 to cause the stud 30ᵇ to slide upwardly in the passage through the cylinder hub. The two shutter members 10, 11 are at the lower ends thereof inwardly extended to provide flanges 81, 82, see Figs. 8 and 12, which by a rivet or bolt 83 are mounted for relative rotation on a partition 84 of the cylinder. During rotations of the cylinder, it is found that the stud will by the roller 31 riding on the cam disk 70 be elevated into the position indicated in Figs. 2 and 8 of the drawings. The tip 30ᶜ of the stud will during this upward movement spread the two shutter members 10, 11 apart to admit a beam of light to the objective 5 while the cylinder light inlet opening 4 passes across the opening in the front wall of the camera housing. A pair of rollers 85, 86 are shown mounted on the flanges of the shutter to provide a smooth, frictionless operation of the shutter.

As above pointed out, it is an important feature of my invention that means is provided for adjusting the focal length of the objective within the cylinder. This may be done in the following manner. A vertically directed partition 90 is rigidly secured in position within the cylinder and a passage 91 is cut through this partition rigidly to support axially alined cylindrical tubes 92, 93 projecting from the opposite sides of the partition. A tubular guide 94 is seated for rotation in the tubes and it is held against axial displacement by a gear segment 95 centrally rising from the surface thereof and fittingly seated in a recess 96 of the partition. Within this guide are seated annular casing elements 97, 98 of the lenses 99, 100 of the objective. Stems 101, 102 rise from these elements through axially directed slots 103, 104 of the guide 94 and through inclined slots 105, 106 of the tubes 92, 93.

Near the top of the partition is transversely seated a pin 107 on which a gear segment 108 is mounted for rotation and it is in permanent mesh with the gear segment 95 of the guide. A stem 109 rises through the upper hub 13 of the cylinder and a stud 110 projects from the lower end of this stem through an elongated perforation 111 of the gear segment 108. This stem may be manually adjusted in the hub to impart rotation to the two gear segments thereby to rotate the guide 94 and, in rotating, to adjust the lenses axially within the guide as required for modifications of the focal length of the objective. It is important to note that, in addition, a stationary lens 112 is centrally secured in position within the guide for correct focusing during the film exposing rotation of the cylinder.

I claim:

1. A camera of the type described comprising, a housing having a wide arched window in the front wall thereof, a cylinder vertically seated for rotation in the housing, the wall of the cylinder being concentric with and in contact with the window and the housing wall, the cylinder having narrow diametrically alined light inlet and outlet apertures vertically cut through the wall thereof for passage across the window of the housing during rotations of the cylinder, an objective in the cylinder between the apertures thereof, a film mounted for transverse movement in the housing directly behind the cylinder in alinement with the two apertures thereof, means for continuously rotating the cylinder to cause the light inlet thereof to pass across the window of the housing and in passing to admit a beam of light through the objective to the film, and connections from said cylinder rotating means for advancing the film a predetermined distance while the moving cylinder apertures are out of registration with the housing window, in which a partition is placed in the cylinder below the apertures thereof, a pivot centrally rising from said partition, shutter elements mounted for rotative movement on the pivot, and connections from said cylinder rotating means for moving the shutter elements on their pivot to close the inlet aperture of the cylinder while out of registration with the housing window.

2. A device as set forth in claim 1 in which the objective includes two lens assemblies mounted in a tubular casing within the cylinder in axial alinement with the apertures thereof, and means manually operable from without the camera housing for adjusting the assemblies within the casing to determine the focal length of the objective.

3. A device as set forth in claim 1 in which friction eliminating elements are placed in the shutter closing means.

4. A camera of the type described comprising, a housing having a wide arched window in the front wall thereof, a cylinder vertically seated for rotation in the housing, the wall of the cylinder being concentric with and in contact with the window and the housing wall, the cylinder having narrow diametrically alined light inlet and outlet apertures vertically cut through the wall thereof for passage across the window of the housing during rotations of the cylinder, an objective in the cylinder between the apertures thereof, a film mounted for transverse movement in the housing directly behind the cylinder in alinement with the two apertures thereof, a shutter within the cylinder for controlling the light inlet aperture thereof, means for continuously rotating the cylinder to cause the light inlet thereof to pass across the window of the housing in passing to admit a beam of light through the objective to the film, means extending from said cylinder rotating means for closing the shutter when the light inlet passes beyond the window and to maintain the shutter closed until the window again is reached, and connections from said cylinder rotating means for advancing the film a predetermined distance while the moving cylinder apertures are out of registration with the housing window.

5. A camera of the type described comprising, a housing having a wide arched window in the front wall thereof, a cylinder vertically seated for rotation in the housing, the wall of the cylinder being concentric with the window and in contact therewith, the cylinder having narrow diametrically opposed light inlet and outlet apertures vertically cut through the wall thereof for passage across the window of the housing, an objective in the cylinder between the apertures thereof, a film mounted for transverse movement in the housing directly behind the cylinder in alignment with the two apertures thereof, a partition mounted in the cylinder below the apertures thereof, a pivot centrally rising from said partition, arcuate shutter elements mounted on said pivot against the inner surface of the cylinder at both sides of the inlet passage thereof, means for continuously rotating the cylinder to cause the light inlet thereof to pass across the window of the housing in passing to admit a beam of light through the objective to the film, means extending from said cylinder rotating means for rotating the shutter elements on their pivot to maintain the light passage open while the inlet passage of the cylinder moves across the housing window, and connections from said cylinder rotating means for advancing the film a predetermined distance while the moving cylinder apertures are out of registration with the housing window.

6. A device as set forth in claim 5 in which friction eliminating elements are embodied in the shutter opening mechanism.

7. A device as set forth in claim 5 in which the film advancing connections include a set of feed rollers at each side of the cylinder and separate means for advancing the central portion of the film past the cylinder, the film being bent to form loops between the central portion thereof and the two sets of feed rollers.

References Cited in the file of this patent

UNITED STATES PATENTS

| | | |
|---|---|---|
| 624,553 | Shaw | May 9, 1899 |
| 647,890 | Stone | Apr. 17, 1900 |
| 694,929 | Houston | Mar. 4, 1902 |
| 1,943,378 | Elms | Jan. 16, 1934 |
| 2,129,959 | Pollock | Sept. 13, 1938 |
| 2,596,746 | Waller | May 13, 1952 |